Feb. 16, 1971     H. M. ARAK     3,564,589
IMMERSION-TYPE AQUARIUM HEATER WITH AUTOMATIC
TEMPERATURE CONTROL AND MALFUNCTION SHUT-OFF
Filed Oct. 13, 1969
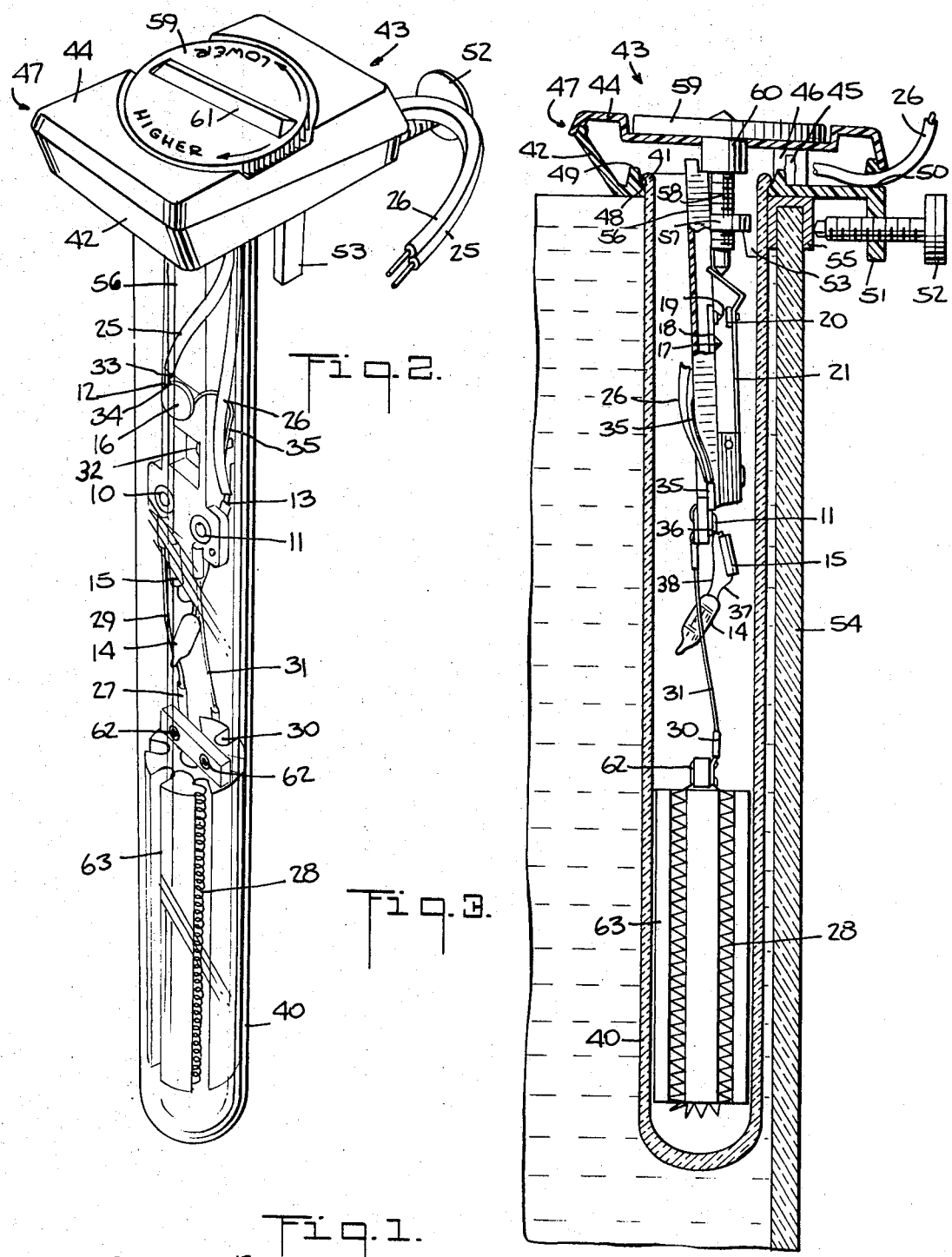
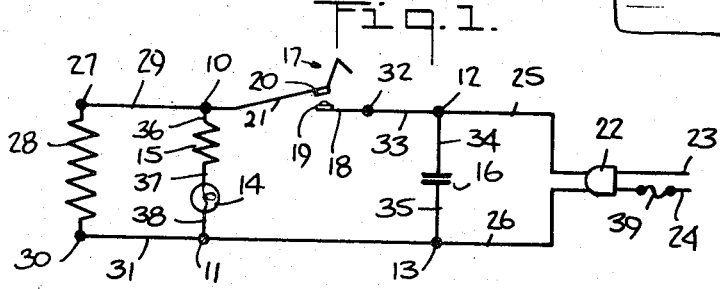
INVENTOR.
HENRY M. ARAK
BY
ATTORNEY United States Patent Office 3,564,589
Patented Feb. 16, 1971

3,564,589
IMMERSION-TYPE AQUARIUM HEATER WITH AUTOMATIC TEMPERATURE CONTROL AND MALFUNCTION SHUT-OFF
Henry M. Arak, 2480 Ocean Parkway, Brooklyn, N.Y. 11235
Filed Oct. 13, 1969, Ser. No. 865,621
Int. Cl. H05h 3/78
U.S. Cl. 219—331                                                 5 Claims

ABSTRACT OF THE DISCLOSURE

An immersion-type electric aquarium heater consisting of a housing, securable to an aquarium wall, in combination with an open-necked tube opening into and suspended from the housing, with a heating element and a mounting-supported temperature-responsive switch unit disposed within the tube and electrically connected in a circuit to an electric plug, with the contact points of the switch unit members manually adjustable with respect to each other, and a capacitor electrically connected across the lines of the electric plug in a circuit parallel to the circuit of the heating element.

---

This invention relates to the field of devices for the heating, and controlling the temperature of, water in aquariums and the like, and has for its objective the provision of an improved immersion-type heater, having automatic thermostatic temperature control, which is provided with the means for automatic shut-off of the current in the event of malfunction of the unit caused by a short in the capacitor, whereby the standard house fuse in the line supplying the current is caused to blow out, or the circuit breaker (in such cases) to detach, cutting off all current in the line and thereby alerting the owner to the breakdown.

Specifically, this invention relates to the type of aquarium heater which includes a rigid, electrically insulating housing, from which is suspended an open-necked tube containing the heating unit. An insulating support for a thermostat-operated switch unit is secured to the base of the housing and projects downward into the tube, where the switch unit is electrically connected to the heater unit. The switch unit generally employed therewith is temperature-responsive to control the flow of current to the heater unit and comprises an adjustable spring metal switch member and a bi-metal switch member provided with adjourning contact areas or points which, when in contact, close an electric circuit actuating the heating element to heat the aquarium water. When the desired temperature is reached the space, or air gap, between the contact points is so regulated manually that a drop in the temperature of the water will cause automatic reengagement of the contact points, thereby again closing the circuit and reactivating the heating element until the temperature of the water again reaches the predetermined desired level. Automatic control of the temperature of the water to a desired level is thereby maintained.

Many presently known aquarium heaters employ a capacitor, or condenser, in a shunt circuit to eliminate or suppress noises of radio and television frequencies caused by the arcing at the contact points of the temperature-responsive switch unit. The disadvantage of such a circuit is that in the event of a short or breakdown of the capacitor the entire current flows through the capacitor, even with the responsive switch open, causing the overheating of the water with the consequent killing of the fish. Another form of aquarium heater of this type, as disclosed in my Pat. No. 2,699,488, provides a fuse in series with the capacitor in the shunt circuit of such value that any substantial increase of current flowing through the capacitor in excess of the normal, which would occur in a shorting of the capacitor, would blow out this fuse and thereby open the shunt circuit, permitting current to flow only by the closing of the temperature-responsive switch. While this would continue to control the temperature of the water the breakdown of the capacitor would eliminate control of the aforementioned radio and television intereference. The disadvantages in this type of circuit are the additional expense involved in providing a suitable fuse in the shunt circuit and also that the breakdown in the heater operation would not be readily apparent except by close and constant examination or unless and until the radio or television were used and the interference recognized as caused by such breakdown.

The objectives and advantages of the present invention over the foregoing types of heaters are many.

First, the present invention provides a capacitor disposed in the electrical circuit which, in the event of its breakdown, would cause the house fuse in the line to blow, or the circuit breaker to disengage, thereby preventing further operation of the heater with possible resultant damage, and also alerting the owner to such breakdown because all other appliances and house lights on the same line would cease to function.

Second, the present invention eliminates the expense of providing and installing a fuse in each heater and uses only the same basic components used in present types of heaters. In the event of a breakdown of the capacitor the only expense would be that of a replacement capacitor in the line, which is negligible.

A third important object and advantage of the present invention is that the blowing of the house fuse requires only a fuse replacement, at a very small cost, or re-engaging the circuit breaker, in which event there is no expense involved.

A further advantage in the present invention is that the resistance of the heating element is thereby added to that of the capacitor, plus the inductance of the heating element to the capacitor, thereby increasing the effectiveness of the capacitor in suppressing radio noise.

Yet another important object and advantage of the present invention is the provision of a simplified electrical circuit for the heater. These and other salient objects, advantages and functional features of my invention, together with the novel features of construction, composition and arrangement of parts, will be more readily apparent from an examination of the following specification, taken with the accompanying drawings, wherein:

FIG. 1 is a wiring diagram of the electrical connections related to the invention, and their relative dispositions;

FIG. 2 is a side, perspective view of a preferred embodiment of the invention; and FIG. 3 is a side, cross-sectional view of the embodiment shown by FIG. 2, shown secured to the wall of an aquarium.

Similar reference characters designate similar parts throughout the different views.

Referring now to FIG. 1, there is disclosed diagrammatically an electric circuit comprising terminals 10, 11, 12 and 13, a pilot light 14 and a resistor 15 connected in series across terminals 10 and 11, a capacitor 16 connected across terminals 12 and 13, an adjustable thermostatic switch unit 17 having a bi-metal strip 18 provided with contact point 19 adapted to make contact with the contact point 20 of an angularly-shaped springy switch member 21 connected to terminal 10, the strip being connected to terminal 12, the thermostatic switch unit 17 being thus connected across terminals 10 and 12. Lead plug 22 connects with power supply lines 23 and 24, with one terminal of the plug 22 connected to terminal 12 through the lead 25, while its other terminal is connected to terminal 13 through the lead 26. One terminal 27 of the Nichrome heating element 28 is connected through lead 29 to terminal 10, while its other terminal 30 connects through lead 31 to terminal 11. Switch member 21 is connected to terminal 10, while terminal 32 of the bi-metal member 18 is connected by lead 33 to terminal 12. One terminal of the capacitor 16 is connected by lead 34 to terminal 12, while its other terminal is connected by lead 35 to terminal 13. One terminal of the resistor 15 is connected through lead 36 to terminal 10, while the other terminal of the resistor 15 is connected through lead 37 to one terminal of the pilot light 14, whose other terminal is connected through lead 38 to terminal 11. Power line 24 is provided with a fuse 39 of sufficient value to prevent overload of the line by blowing (under different situations) a circuit breaker is employed instead.

Coming, now, to the embodiment shown by FIGS. 2 and 3, which employs the electrical circuits hereinabove described, the aquarium heater comprises a tube 40, preferably of transparent and heat-resistant glass, having an enlarged neck 41 in engagement with the base portion 42 of an electrically insulating housing 43. The base section 42 is secured to the top section 44 of the housing 43 by means of a screw 45 recessed through the base section 42 and threaded into a boss 46 in the top section 44, with the sections 42 and 44 fitted in an overlap engagement 47. Base section 42 is provided with a central opening 48 to accommodate the enlarged neck 41 of the tube 40, and a surrounding shoulder 49 acting as a seat for the neck 41, and with extrusions (not shown) on the undersurface of the top section 44 adapted to abut the neck 41 to hold the tube 40 firmly in place. The base section 42 is further provided with an opening 50 through which the leads 25 and 26 enter the housing 43, and an extension 51 which threadedly receives a screw 52, and a pair of opposing projections 53 which are adapted to abut the inner surface of the aquarium wall 54 in a conventional manner to secure the heater to the wall 54 at its rim 55 by the engagement of the screw 52 against the rim 55, as shown in FIG. 3.

A thermostat base or switch mounting 56, substantially rectangular in shape, is provided at its top with a threaded boss 57 adapted to receive a regulating screw 58 provided with an enlarged serrated head 59 mounted on a ring 60 which is rotatably disposed through an opening in the roof of the housing 43, for the regulation of the thermostatic switch unit 17, the head 59 being provided with a raised cross-piece 61 and directional indicators to designate direction for rotation of the screw 58 to adjust the spacing or distances of the contact points 19 and 20 with respect to one another. The screw 58 is so disposed through the boss 57 as to bear, by rotation, against the surface of the angular member 21 for the purpose of urging the spring member 21 toward the bi-metal member 18 so that their respective contact points 20 and 19 will contact to close the circuit, and by rotation in the opposite direction to ease the pressure on the spring member 21 to space the contact point 20 away from the contact point 19, as is well known in the art, to open the circuit when the desired temperature is reached. The switch mounting 56 is cut out on the side below the screw 58, and within the recess provided the bi-metal strip 18 is secured to terminal 32 to which is secured lead 33 contacting terminal 12 and lead 25. Below the recess and on a projecting surface of the switch mounting 56 the angular spring member 21 is secured to terminal 10 and so disposed as to be substantially parallel with the bi-metal strip 18, with the respective contact points 18 and 19 opposed to one another and adapted to contact when the rotation of the screw 58 urges the angular spring member 21 toward the bi-metal strip 18. The resistor 15 and lamp 14 are connected by respective leads 36, 37 and 38 to terminal 10 and terminal 11, and to each other in a series, as shown in FIGS. 1 and 3, and the terminals 27 and 30 of the Nichrome heating element 28 are connected respectively to terminals 10 and 11 by respective leads 29 and 31. The terminals 27 and 30 are secured by rivets 62 to a heat insulating block or base 63 of conventional design, with the connected heating element 28 wound around the block 63, as shown in FIGS. 2 and 3. The capacitor 16 is connected by respective leads 34 and 35 to the terminals 12 and 13, thereby being connected directly to the respective leads 25 and 26, and constituting, with the heating element 28 and the resistor 15 and lamp 14, parallel circuits.

The top of the switch mounting 56 is further provided with a pair of wing-like extrusions (not shown) flush with its top surface, which fit into recesses (likewise not shown) in the inner sides of base section 42, to hold the switch mounting 56 rigidly perpendicular to the housing 43 and to prevent rotation of the switch mounting 56 with respect to the housing 43.

In the embodiment shown the capacitor 16, along with the heating element 28, lamp 14 and resistor 15, is disposed within the tube 40, as shown, but it is obvious that the capacitor 16 may as easily be located at any point along the lines 25 and 26, between the thermostat switch 17, heating element 28 and lamp 14-resistor 15 circuits on one side thereof, and the plug 22 on the other, and function equally well. Thus, the capacitor, instead of being disposed within the tube 40, as shown, may be connected across the lines 25 and 26 within the housing 43, may be connected to the lines between the housing 43 and the plug 22 or even within the plug 22.

In the operation of my invention the aquarium heater is secured to the wall of the aquarium with the tube 40 immersed in the water and the housing 43 disposed above the water and locked to the aquarium wall 54 by engagement of the screw 52 against the rim 55. After the tube 40 has been acclimated to the water temperature the plug 22 is inserted into a convenient wall outlet and the screw 58 rotated clock-wise until the contact points 19 and 20 close the circuit, as will be indicated when the pilot lamp 14 goes on. When the water temperature reaches the desired level, as determined by a thermometer, the screw 58 is adjusted to maintain this level automatically, as is well known in the art. In the event of the breakdown or shorting of the capacitor 16 the increase of current through the capacitor 16 causes a short in the direct lines 25 and 26, causing the house fuse 39 to blow, cutting off current to the heater and to all other appliances and connections on the same line, thereby alerting the owner to the malfunction. Further, the installation of the capacitor 16, as disclosed herein, serves to combine the resistance of the heating element 28 with that of the capacitor 16, plus the inductance of the heating element 28 added to the capacitor 16, thereby increasing the effectiveness of the latter in suppressing radio noises.

When the capacitor 16 shorts, as above indicated, it is a simple and inexpensive matter to replace it with a new capacitor, and the heater is again operative.

From the foregoing it is obvious that the embodiment shown and described is by way of illustration and not of limitation, and that various changes may be made, as above indicated, without limitation upon or departure from the spirit and scope of the invention or sacrificing any of the advantages thereof inherent therein, all of which are herein claimed.

Having described my invention, I claim:

1. An immersion-type electric aquarium heater adapted to be connected to a power line incorporating a safety fuse, comprising an electrically insulating housing, mounting means to secure the housing to an aquarium wall, an open-necked tube of transparent, heat-resistant and electrically non-conductive material being suspended from and opening into the housing, an electric heating element disposed in the lower portion of the tube, a thermostatic switch mounting supported by the housing and extending into the tube, a temperature-responsive switch unit secured to the mounting, the switch unit comprising a bi-metal strip member secured at one end and free at its other end and provided with a contact point at its free end, and an angular springy member disposed substantially parallel with the bi-metal strip member, secured at one end to the mounting and free at its other end and provided with a contact point disposed to come in registry with the contact point of the strip member, regulating means to adjust the space between said contact points, the secured end of the bi-metal strip member being electrically connected to one terminal of an electric plug, the secured end of the angular springy member being electrically connected to one terminal of the heating element whose other terminal is electrically connected to the other terminal of the electric plug, and a capacitor electrically connected across the electrical lines leading to the plug in a circuit parallel with the circuit of the heating element.

2. An immersion-type electric aquarium heater as described in claim 1, a series connetced lamp and resistor within the tube electrically connected in parallel with the heater element.

3. An immersion-type aquarium electric heater as described in claim 2, the capacitor being disposed in the electric plug.

4. An immersion-type electric aquarium heater as described in claim 1, the regulating means to adjust the space between the contact points comprising a threaded boss integral with the switch mounting and disposed above the angled end of the angular springy member, a screw threaded through the boss with its end above the said angled end, the screw provided with an integral ring disposed through an opening in the roof of the housing and an integral head disposed upon the housing and adapted to be rotated in one direction to urge the angular springy member toward the bi-metal strip member and in the other direction to space the former from the latter.

5. An immersion-type electric aquarium heater as described in claim 2, the regulating means to adjust the space between the contact points comprising a threaded boss integral with the switch mounting and disposed above the angled end of the angular spring member, a screw threaded through the boss with its end above the said angled end, the screw provided with an integral ring disposed through an opening in the roof of the housing and an integral head disposed upon the housing and adapted to be rotated in one direction to urge the angular springy member toward the bi-metal strip member and in the other direction to space the former from the latter.

References Cited

UNITED STATES PATENTS

| | | | |
|---|---|---|---|
| 2,699,488 | 1/1955 | Arak et al. | 219—328 |
| 3,107,290 | 10/1963 | Willinger | 219—523X |

OTHER REFERENCES

Rocco F. Ficchi, Electrical Interference, Hayden Book Company, Inc., N.Y., 1964, TK 153 F46 c. 2, pp. 106–7.

VOLODYMYR Y. MAYEWSKY, Primary Examiner

U.S. Cl. X.R.

219—510, 523